US012756610B2

(12) United States Patent
Werner et al.

(10) Patent No.: US 12,756,610 B2
(45) Date of Patent: Oct. 6, 2026

(54) TRANSMITTING SYNCHRONISATION SIGNALS ON MULTIPLE CARRIERS

(71) Applicant: Telefonaktiebolaget LM Ericsson (publ), Stockholm (SE)

(72) Inventors: Karl Werner, Segeltorp (SE); Sven Petersson, Sävedalen (SE); Tobias Johansson, Stockholm (SE); Kajsa Nilsson, Huddinge (SE); Rikke Apelfröjd, Knivsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/036,498

(22) PCT Filed: Dec. 18, 2020

(86) PCT No.: PCT/SE2020/051232
§ 371 (c)(1),
(2) Date: May 11, 2023

(87) PCT Pub. No.: WO2022/131978
PCT Pub. Date: Jun. 23, 2022

(65) Prior Publication Data
US 2023/0412440 A1 Dec. 21, 2023

(51) Int. Cl.
*H04L 27/26* (2006.01)

(52) U.S. Cl.
CPC ................................ *H04L 27/2621* (2013.01)

(58) Field of Classification Search
CPC ................................................... H04L 27/2621
See application file for complete search history.

(56) References Cited

U.S. PATENT DOCUMENTS

2011/0280189 A1* 11/2011 Tsuboi ................ H04L 27/2621 370/328
2012/0093088 A1* 4/2012 Yang ....................... H04L 5/001 370/328

(Continued)

FOREIGN PATENT DOCUMENTS

WO WO-2018020227 A1 * 2/2018
WO WO-2019231381 A1 * 12/2019 ........... H03F 1/3241

OTHER PUBLICATIONS

International Search Report and Written Opinion of the International Searching Authority, PCT/SE2020/051232, mailed Sep. 13, 2021, 8 pages.

(Continued)

*Primary Examiner* — Jaison Joseph
(74) *Attorney, Agent, or Firm* — Sage Patent Group

(57) ABSTRACT

The present disclosure provides a base station for transmitting synchronisation signals on a plurality of carriers, wherein the base station includes processing circuitry and a machine-readable medium storing instructions which, when executed by the processing circuitry, cause the base station to apply a time shift to at least part of a first synchronisation signal to be sent by the base station on a first carrier of the plurality of carriers such that the at least part of the first synchronisation signal is offset in time from a second synchronisation signal to be sent on a second carrier of the plurality of carriers. The base station is further caused to combine signals for the plurality of carriers, including the first and second synchronisation signals, to form a combined signal, amplify the combined signal using a power amplifier, and transmit the amplified combined signal.

19 Claims, 7 Drawing Sheets

(56) References Cited

U.S. PATENT DOCUMENTS

| | | | | |
|---|---|---|---|---|
| 2013/0308656 | A1 | 11/2013 | Malkin et al. | |
| 2018/0139036 | A1* | 5/2018 | Islam | H04W 52/36 |
| 2023/0412440 | A1* | 12/2023 | Werner | H04L 27/2614 |

OTHER PUBLICATIONS

Dahlman, Erik et al., "5G NR: The Next Generation Wireless Access Technology," Elsevier Academic Press, Aug. 9, 2018, selected pages (213, 259 and figure 10.20).

3GPP TS 38.211 v16.3.0 (Sep. 2020); 3rd Generation Partnership Project; Technical Specification Group Radio Access Network; NR; Physical channels and modulation (Release 16); 133 pages.

3GPP TS 38.133 v16.5.0 (Sep. 2020); 3rd Generation Partnership Project; Technical Specification Group Radio Access Network; NR; Requirements for support of radio resource management (Release 16); 1608 pages.

* cited by examiner

TRANSMITTING SYNCHRONISATION SIGNALS ON MULTIPLE CARRIERS

CROSS REFERENCE TO RELATED APPLICATIONS

This application is a 35 U.S.C. § 371 national stage application of PCT International Application No. PCT/SE2020/051232 filed on Dec. 18, 2020, the disclosure and content of which is incorporated by reference herein in its entirety.

TECHNICAL FIELD

Embodiments of the present disclosure relating to wireless communication and in particular to apparatus and methods for transmitting synchronisation signals on a plurality of carriers.

BACKGROUND

Synchronisation signals are used in wireless communication networks to enable wireless devices to discover cells and achieve time and frequency synchronisation with a discovered cell. In New Radio (NR) networks, for example, base stations broadcast synchronisation signal blocks (SSBs) in the cell. An SSB comprises a primary synchronisation signal (PSS), a secondary synchronisation signal (SSS), a physical broadcast channel (PBCH) and a Demodulation Reference Signal (DMRS) for the PBCH. Each of the signals forming the SSB may be mapped to an Orthogonal Frequency Division Multiplexing (OFDM) grid, with the PSS and the SSS spanning one OFDM symbol and the DMRS spanning three OFDM symbols. The sequences used by a base station for the PSS and the SSS may be determined based on the physical cell identifier (PCI) of the cell. For example, one of three sequences may be used for the PSS and a base station may determine which of the three sequences to use for a cell based on its PCI. Further information may be found in the 3rd Generation Partnership Project (3GPP) Technical Specification (TS) 38.211 v16.3.0, as well as in 5G NR: The Next Generation Wireless Access Technology, by Erik Dahlman, Stefan Parkvall and Johan Skold, August 2018.

Base stations are increasingly being configured to support multiple carriers. In order to transmit across multiple carriers, a base station may multiplex signals for the carriers using digital signal processing to form a single time-domain signal. The resulting combined signal is then converted to the analogue domain and amplified using a power amplifier before transmission.

When the combined signal is input to a power amplifier, the relationship between the power of the (input) combined signal and the corresponding output signal may be non-linear, with the output signal being limited to a maximum output amplitude. This means that a power amplifier may be nearly linear in its response for low signal levels, but the output signal for higher input amplitudes may be limited in amplitude. This phenomenon, referred to as clipping, may particularly affect input signals with large amplitude fluctuations. Peak-to-average power ratio (PAPR) and cubic metric (CM) are two metrics that are commonly used to quantify amplitude fluctuations and thus the signal distortion that may be caused when a signal is amplified by a power amplifier. In particular, inputting a signal with a high PAPR and CM into a power amplifier can result in severe clipping of the signal waveform, particularly when the PA operates near its maximum output transmit power.

SUMMARY

As described above, multi-carrier base stations may be configured to multiplex signals to form a combined signal for amplification by a power amplifier. In particular, the synchronisation signals for different carriers may be combined such that synchronisation signals for different carriers are scheduled to be transmitted simultaneously. In typical NR deployments, for example, the SSB may be transmitted simultaneously by a base station on all carriers. If multiple carriers for a single base station are assigned the same PCI, the same PSS sequence (and potentially the same SSS sequence) may be used for multiple carriers, so that part of the SSB may be repeated in multiple bands. Even if each carrier is assigned a different PCI, there may be reuse of PSS sequences across carriers since there are only a small number of PSS sequences available.

When signals for multiple carriers are combined before amplification, use of the same synchronisation signals across multiple carriers results in the combined signal having large amplitude variations and hence large PAPR and CM values. As a result, inputting the combined signal into a power amplifier for amplification can result in clipping of the waveform of the combined signal, particularly when the power amplifier operates near its maximum output transmit power. This can cause in-band signal distortion as well as out-of-band spurious emissions that may degrade performance.

Clipping can be avoided by increasing the linearity requirements for the power amplifier by, for example, employing linearization techniques or changing the power amplifier design. However, this can be expensive and may require specialised hardware. Alternatively, the transmit power could be reduced (e.g. backing-off the transmit power) to reduce the probability of clipping. However, reducing the coverage in this manner may make it more difficult for wireless devices to detect the transmitted synchronisation signals.

Embodiments of the present disclosure seek to address these and other problems. In one aspect, a base station for transmitting synchronisation signals on a plurality of carriers is provided. The base station comprises processing circuitry and a machine-readable medium storing instructions which, when executed by the processing circuitry, cause the base station to apply a time shift to at least part of a first synchronisation signal to be sent by the base station on a first carrier of the plurality of carriers such that the at least part of the first synchronisation signal is offset in time from a second synchronisation signal to be sent on a second carrier of the plurality of carriers. The base station is further caused to combine signals for the plurality of carriers, including the first and second synchronisation signals, to form a combined signal, amplify the combined signal using a power amplifier, and transmit the amplified combined signal.

In another aspect, a method performed by a base station for transmitting synchronisation signals on a plurality of carriers is provided. The method comprises applying a time shift to at least part of a first synchronisation signal to be sent by the base station on a first carrier of the plurality of carriers such that the at least part of the first synchronisation signal is offset in time from a second synchronisation signal to be sent on a second carrier of the plurality of carriers. The method further comprises combining signals for the plurality of carriers, including the first and second synchronisation signals, to form a combined signal, amplifying the combined signal using a power amplifier, and transmitting the amplified combined signal.

In a further aspect, a base station configured to perform the aforementioned method is provided. In another aspect, a computer program is provided. The computer program comprises instructions which, when executed on at least one processor of a base station, cause the base station to carry out the aforementioned method. In a further aspect, a carrier containing the computer program is provided, in which the carrier is one of an electronic signal, optical signal, radio signal, or non-transitory machine-readable storage medium.

BRIEF DESCRIPTION OF THE DRAWINGS

Embodiments of the present disclosure will now be described, by way of example only, with reference to the following drawings.

BRIEF DESCRIPTION OF THE DRAWINGS

Figure 1:
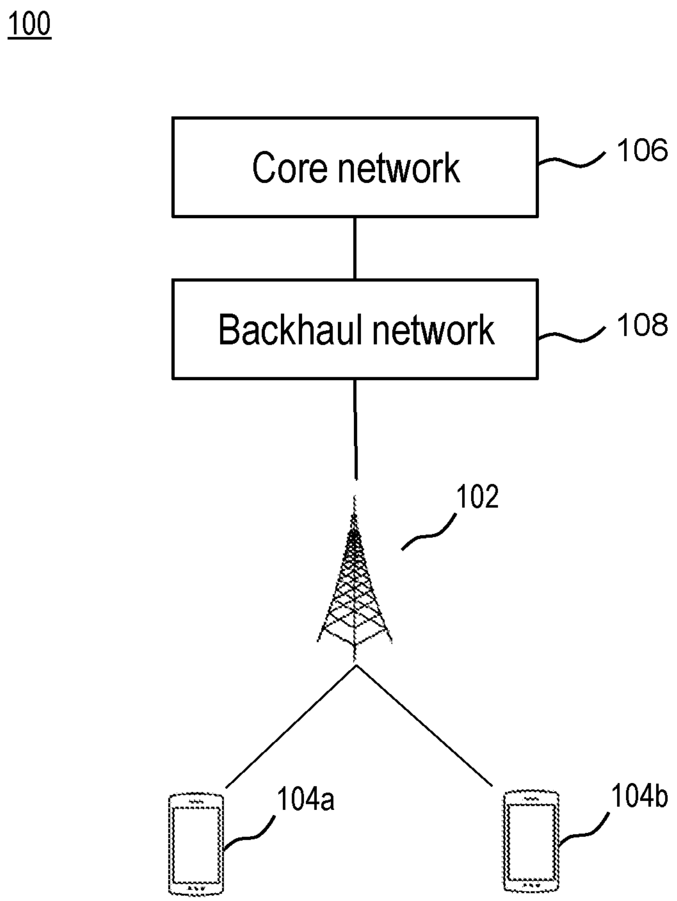
FIG. 1 shows an illustration of a communications network according to embodiments of the disclosure.

FIG. 1 shows a communications network 100 according to embodiments of the disclosure. The communications network 100 may implement any suitable wireless communications protocol or technology, such as Global System for Mobile communication (GSM), Wide Code-Division Multiple Access (WCDMA), Long Term Evolution (LTE), New Radio (NR), WiFi, WiMAX, or Bluetooth wireless technologies. In one particular example, the communications network 100 forms part of a cellular telecommunications network, such as the type developed by the 3$^{rd}$ Generation Partnership Project (3GPP). Those skilled in the art will appreciate that various components of the network 100 are omitted from FIG. 1 for the purposes of clarity.

The communications network 100 comprises a base station 102 configured to provide radio service to one or more wireless devices in its coverage area, coupling the wireless devices to a core network 106 in the communications network 100 (e.g. via a backhaul network 108). In the illustrated embodiments, two wireless devices 104*a*, 104*b* (collectively 104) are shown. However, the skilled person will appreciate that the communications network 100 may comprise any number of wireless devices and may comprise many more wireless devices than those shown.

The base station 102 may be, for example, a Node B, evolved Node B (eNB), a next generation Node B (gNB) or any other suitable base station. The base station 102 is a multi-carrier base station, in that it is operable to transmit on a plurality of radio carriers.

The base station 102 transmits signals on the plurality of carriers, including user data, control data and reference signals such as synchronisation signals. The synchronisation signals may enable wireless devices in its coverage area, such as the wireless devices 104, to detect cells served by the base station 102 and achieve time and frequency synchronisation with the detected cells. The synchronisation signals may comprise any signals which are suitable for one or more of these purposes. In New Radio (NR), the base station 102 broadcasts synchronisation signal blocks (SSBs) comprising a primary synchronisation signal (PSS) and a secondary synchronisation signal (SSS). The wireless devices 104 receiving the synchronisation signals may, for example, use the PSSs to achieve synchronisation in the time domain (e.g., to subframe, slot and/or symbol). The PSSs may also be used to identify the centre of the bandwidth for each carrier. The wireless devices 104 may use the SSSs to determine radio frame synchronisation in the time domain. The wireless devices 104 may use both the PSSs and the SSSs to determine respective physical cell identities (PCIs) for the carriers.

The base station 102 is thus configured to transmit synchronisation signals on a plurality of carriers. Prior to transmission, the base station 102 combines signals for multiple carriers and amplifies the combined signal using a power amplifier. Often, the synchronisation signals for multiple carriers will be transmitted simultaneously across those carriers. However, transmitting synchronisation signals on multiple carriers can increase the magnitude of amplitude fluctuations in the combined signal, which increases the risk that clipping will occur at the power amplifier. This is particularly the case when the same synchronisation sequence is transmitted at the same time.

Figure 2A:
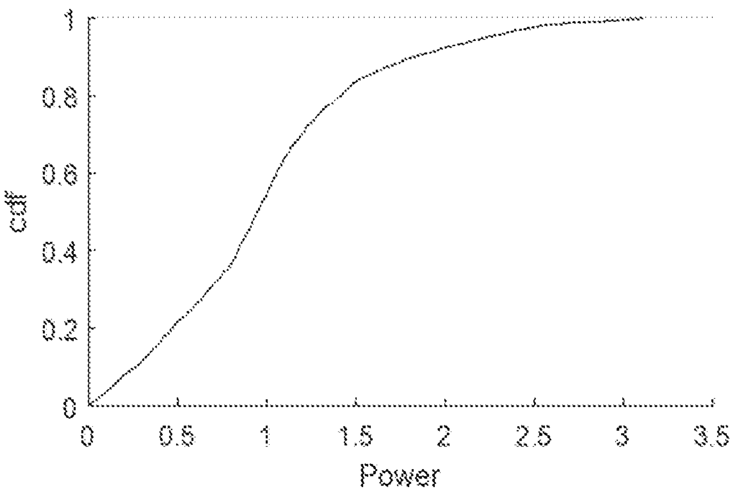
FIGS. 2*a* and 2*b* show signal power measurements for simulations of a base station.
Figure 2B:
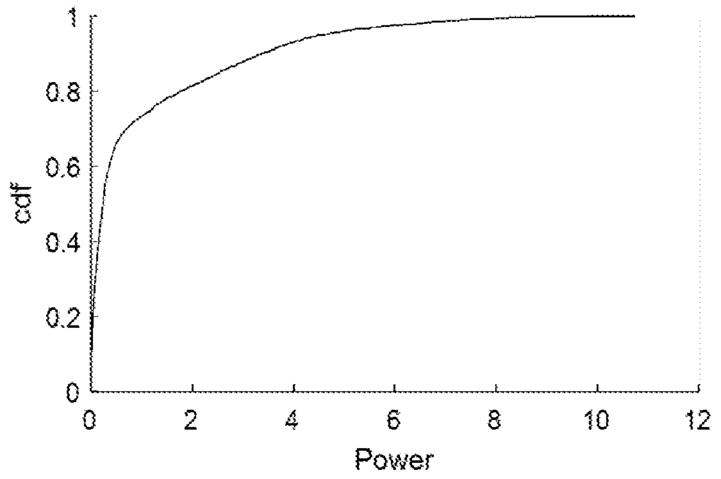

This is illustrated by FIGS. 2*a* and 2*b*, which show signal power measurements for simulations of signals to be transmitted by a base station. FIG. 2*a* shows a cumulative distribution function (cdf) of signal power in a first simulation, in which the signal comprises a PSS sequence in the first 127 subcarriers of a 100 MHz carrier. In contrast, FIG. 2*b* shows a cumulative distribution function of signal power for a signal in a second simulation, in which the signal comprises the same PSS sequence repeated across four 100 MHz carriers. Although many of the samples indicated in FIG. 2*b* still have a low power, the peak power in FIG. 2*b* is much higher than in FIG. 2*a*, showing that repeating PSS sequences across multiple carriers increases the magnitude of amplitude fluctuations in the combined signal. The peak-to-average power ratio (PAPR) for the signal in the second simulation (FIG. 2*b*) is thus larger than for the signal in the first simulation (FIG. 2*a*), which means that the signal in the second simulation is more likely to experience signal distortion (e.g. clipping) when it is amplified by a power amplifier.

Methods and apparatus are therefore needed for reducing the risk of signal distortion occurring when synchronisation signals are amplified for transmission across multiple carriers.

Aspects of the disclosure seek to address these and other problems by applying one or more time shifts to synchronisation signals to be transmitted on different carriers, such that at least part of a first synchronisation signal is offset in time from a second synchronisation signal scheduled to be transmitted on another carrier.

Thus, for example, the base station 102 may apply a time shift to a first synchronisation signal to be transmitted by the base station 102 on a first carrier such that the first synchronisation signal is offset in time from at least one second synchronisation signal to be transmitted by the base station 102. The base station 102 combines signals for transmission, including the first and second synchronisation signals and amplifies the combined signal using a power amplifier. By applying the time shift to the first synchronisation signal, the base station 102 may reduce the PAPR and/or cubic metric (CM) of the combined signal, thereby reducing the risk of signal distortion (e.g. clipping) occurring when the combined signal is amplified by the power amplifier. The base station 102 transmits the amplified combined signal which may then be received by the wireless devices 104.

The base station 102 may apply one or more time shifts to synchronisation signals to be sent on the plurality of carriers. The time shifts may be applied such that two synchronisation signals comprising the same sequence are offset in time from each other. For example, by applying a time shift to a first synchronisation signal, the base station 102 may offset the first synchronisation signal in time from other synchronisation signals to be transmitted by the base station 102 that also comprise the same synchronisation sequence. Offsetting two identical synchronisation signal sequences such that they are not sent simultaneously may reduce the magnitude of amplitude fluctuations in the combined signal input to the power amplifier at the base station 102, thereby reducing the risk of the amplified signal being distorted. In particular examples, the time shifts may be applied such that any two synchronisation signals transmitted on different carriers and comprising the same sequence are offset in time from each other, thereby further minimising the risk of signal distortion occurring.

The skilled person will appreciate that there may be many situations in which the same sequence may be used for synchronisation signals on two different carriers. For example, in cellular networks (e.g. NR or LTE networks), the sequences used for PSSs and SSSs to be transmitted on a carrier may be determined as a function of a physical cell identifier (PCI) associated with the carrier. Base stations may thus be configured to use the same PSS sequences for PSSs on carriers associated with the same PCI. Similarly, base stations may be configured to use the same SSS sequences, or be more likely to use the same SSS sequences, for SSSs on carriers associated with the same PCI. This repetition of synchronisation signal sequences across multiple carriers risks increasing the PAPR and CM when synchronisation signals are multiplexed together, thereby increasing the risk of signal distortion occurring when synchronisation signals are amplified for transmission.

Accordingly, the time shift applied by the base station 102 for the first carrier may be determined based on a PCI value associated with the first carrier. The time shift for a first carrier may be determined such that the synchronisation signals for that carrier are offset in time from synchronisation signals to be transmitted on other carriers sharing the same PCI. For example, the base station 102 may apply the time offset to the first carrier in response to determining that the first carrier and the second carrier have the same PCI. This provides a method by which identical synchronisation sequences can be effectively offset in time, thereby reducing the risk of signal distortion occurring during amplification.

However, there are also situations in which the base station 102 may use the same synchronisation sequences for multiple carriers, even though they are associated with different PCIs. The base station 102 may, for example, be configured to repeat the sequences used for synchronisation signals for different carriers according to a repetition pattern. In these embodiments, the time offset may be determined based on the repetition pattern. The base station 102 may, for example, be configured to repeat sequences used for synchronisation signals every n carriers and the time offset may be determined based on n.

For example, base stations in NR networks may be configured to use one of three sequences for PSSs, which means that a base station may be configured to repeat PSS sequences every n=3 carriers. Accordingly, the same PSS sequence may be used for carriers sharing the same carrier index $N_{ind}=N_{PCI}$ mod 3, in which $N_{PCI}$ is the PCI value for a respective carrier. The time shift applied by a base station for a particular carrier may thus be determined based on the carrier index, $N_{ind}$, which indicates the synchronisation sequence used for the carrier. For example, the time shift applied by the base station 102 to the first synchronisation signal for the first carrier may be applied based on a determination that the first and second carriers have the same carrier index. In another example, in a four-carrier NR base station in which the first and fourth carriers have different PCI values, $N_{PCI,1}=4$ and $N_{PCI,2}=1$, the first and fourth carriers have the same carrier index, $N_{ind}=1$. Therefore, a time shift may be applied to at least one of the two carriers such that they are offset in time from one another.

As noted above, PSSs may be configured to repeat every three carriers in NR networks. Those skilled in the art will appreciate that different numerologies may be used in other networks, with different numbers of PSS sequences being utilized in the base stations. In general, the base station 102 may be configured to repeat (e.g. reuse) sequences for synchronisation signals every n carriers and thus the time offset applied to the at least part of the first synchronisation signal may depend on $N_{ind}=N_{PCI}$ mod n. Here, the PCI values are effectively used as an indicator of the order in which carriers are assigned sequences for synchronisation signals. The skilled person will thus appreciate that, in general, any counter indicating the order in which sequences are assigned may be used for this purpose.

The time shift applied to the first synchronisation signal may thus be determined based on one or more parameters associated with carriers of the base station 102. The parameters may be indicative of one or more sequences used by the base station 102 for synchronisation signals. In a simpler example, the time offset applied to a first synchronisation signal may be determined based on its carrier number. Each carrier in the plurality of carriers (e.g. each of the carriers supported by the base station 102) may be assigned a unique number, referred to as a carrier number. The delay applied to the carriers may be determined based on their respective carrier number. In this way, the synchronisation signals for all of the carriers may be offset from one another, providing a simple way for ensuring that any identical synchronisation sequences are offset in time.

Further reductions in PAPR and CM may be obtained by making use of the properties of synchronisation signals. In particular, synchronisation sequences are often designed to have low correlation with one another such that two different synchronisation sequences are not closely correlated. For example, PSSs in NR networks may be based on m-sequences and designed to have low cross-correlation.

This means that further reductions in the PAPR and CM may be obtained by applying time shifts to synchronisation signals such that any parts of synchronisation signals comprising different sequences on different carriers are not offset from each other in time. The time shifts may thus be determined such that different synchronisation sequences are not offset from one another in time (e.g. they are transmitted simultaneously). In particular, different synchronisation sequences of the same type may not be offset from one another. For example, the time shifts may be determined such that SSSs comprising different sequences are not offset from one another. In another example, PSSs comprising different sequences may not be offset from one another.

Accordingly, synchronisation signals to be transmitted on carriers having the same $N_{PCI}$ may be assigned different time shifts so they are offset in time from one another. As carriers having the same $N_{PCI}$ may use the same SSS sequence, this means that, for example, SSSs for carriers using the same SSS sequence may be offset in time from one another. In contrast, other synchronisation signals to be transmitted on other carriers having different $N_{PCI}$ may not be offset in time from one another (e.g. they may be assigned the same time shifts or no time shifts). Thus, SSSs for carriers using different SSS sequences may be transmitted simultaneously.

For example, the base station 102 may apply the time shift to the first synchronisation signals for the first carrier, offsetting the first synchronisation signals from the second synchronisation signals for the second carrier, in response to determining that the first and second carriers have same $N_{PCI}$. The base station 102 may apply the same time shift to a third synchronisation signal to be transmitted on a third carrier in the plurality of carriers supported by the base station 102, in which the third carrier is associated with a different $N_{PCI}$ to the first carrier. Thus, the synchronisation signals for the first and second carriers may be offset in time from one another because they have the same $N_{PCI}$ value, which indicates that they may use the same sequence for their synchronisation signals.

In contrast, the synchronisation signals for the third carrier may not be offset in time from the synchronisation signals for the first carrier because the first and third carriers have different $N_{PCI}$ values, which may indicate that they use different synchronisation signal sequences. This may be particularly advantageous for SSSs, for example, for which different sequences may be used for different $N_{PCI}$ values.

In another example, synchronisation signals to be transmitted on carriers having the same carrier index, $N_{ind}=N_{PCI}$ mod n, may be assigned different time shifts so that they are offset in time from one another, whereas other synchronisation signals to be transmitted on other carriers having different respective Nod may be assigned the same time shifts (e.g. so they are not offset from one another). This may be particularly advantageous for signals that are repeated every n carriers such as PSSs in NR, for example.

For example, in a four-carrier NR system in which each carrier is assigned a different $N_{PCI}$ in sequence such that $N_{PCI}=\{1, 2, 3, 4\}$ for the first, second, third and fourth carriers respectively, and the sequences used for PSSs are repeated every three carriers, then the first and last carrier may be assigned the same sequence for their PSSs. This is reflected in their carrier index, $N_{ind}$, which is the same for both carriers: $N_{ind}=N_{PCI}$ mod 3=1. Accordingly, synchronisation signals in the first, second and third carriers may be assigned a first time delay $\tau_0$ and the fourth (last) carrier may be assigned a second time delay $\tau_1$ in which $\tau_0 \neq \tau_1$. By assigning the same time shift (or delay) to synchronisation signals that do not share any common sequence, the PAPR and CM of the combined signal may be reduced, further reducing the risk of signal distortion.

The skilled person will appreciate that these approaches may be combined to determine time offsets for different types of synchronisation signals to be sent on the same carriers. In NR networks, for example, the PSS and SSS are comprised in a synchronisation signal block (SSB). The base station 102 may thus apply different time shifts not only on SSBs for different carriers, but also on different signals within the SSB. For example:

1. The first and second carriers have the same $N_{PCI}$ (and thus the same $N_{ind}$), and may thus be assigned different time delays on the entire SSB.
2. The first and second carriers have the same $N_{ind}$, but different $N_{PCI}$. The time delays may thus be determined such that the resources containing the PSSs on the first and second carriers are offset in time, but the SSSs are simultaneous (e.g. not offset in time from one another).
3. The first and second carriers have different $N_{ind}$. The time shifts may be assigned such that synchronisation signals on the first and second carrier are not offset in time from one another.

Embodiments of the present disclosure thus selectively apply time offsets to synchronisation signals (or parts of synchronisation signals) to be sent on a plurality of carriers in order to reduce the risk of signal distortion occurring when the signals are amplified before transmission.

Figure 3:
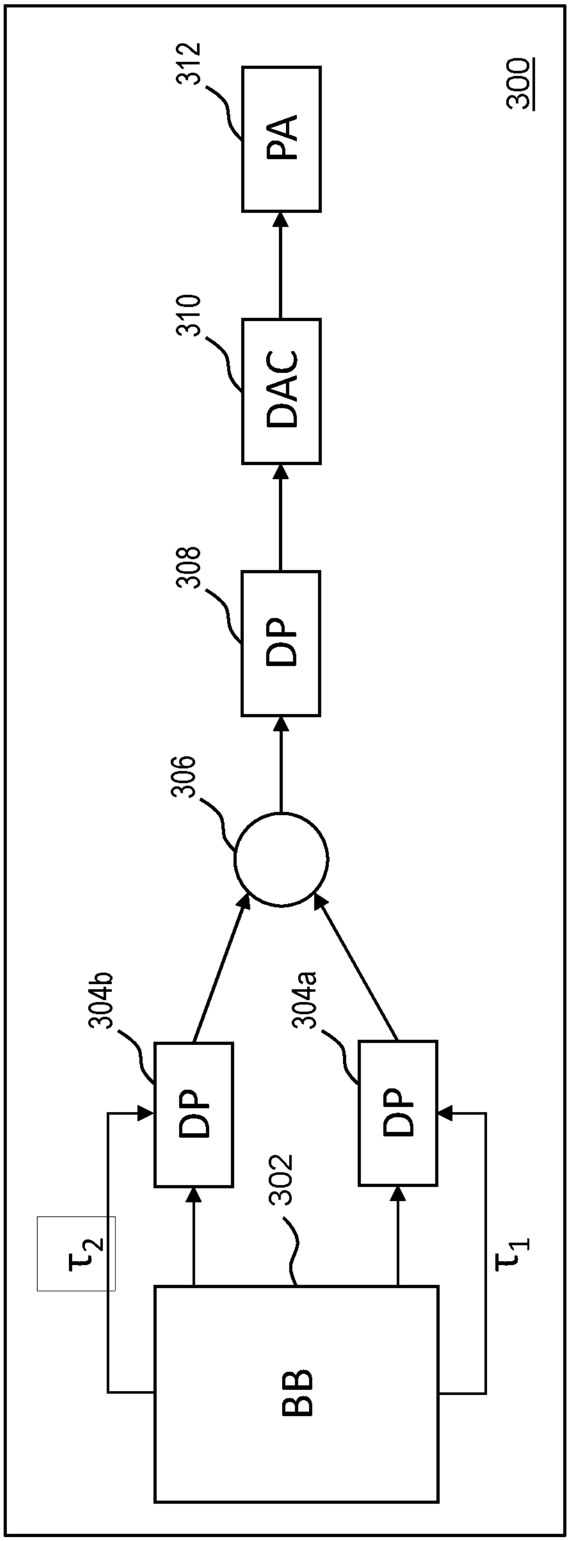
FIG. 3 shows an example of a base station according to embodiments of the disclosure.

FIG. 3 shows a base station 300 for transmitting synchronisation signals on a plurality of carriers according to embodiments of the disclosure. The base station 300 may be, for example, operable to transmit on two carriers, for example. The base station 300 may be the base station 102 described above in respect of FIG. 1, for example.

The base station 300 comprises a baseband unit 302, first and second digital processors 304*a*, 304*b* and a multiplexer 306. The base station 300 further comprises a third digital processor 308, a digital-to-analogue converter (DAC) 310 and a power amplifier 312. The power amplifier 312 may comprise any suitable amplifier such as, for example, a complementary metal-oxide-semiconductor (CMOS) amplifier, a laterally-diffused metal-oxide semiconductor (LDMOS) amplifier, a low-noise preamplifier (LNP), a silicon germanium (SiGe) amplifier, a gallium nitride (GaN) amplifier or a gallium arsenide (GaAs) amplifier. The skilled person will appreciate that the base station 300 may comprise further components that have been omitted for clarity.

Figure 4:
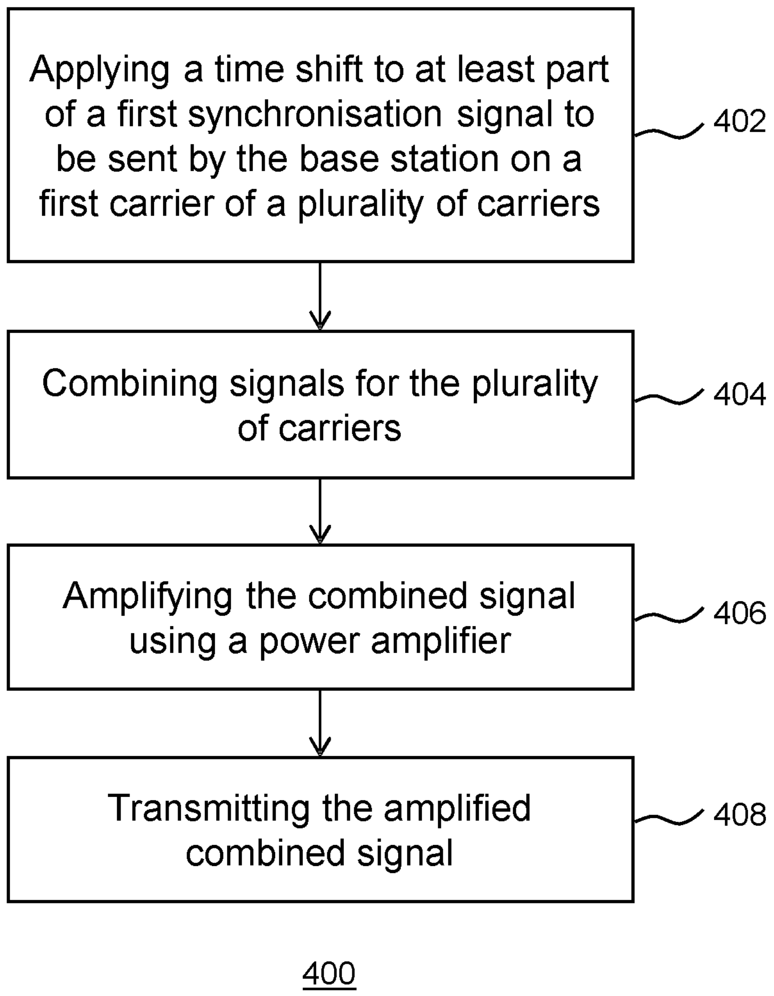
FIG. 4 shows a flowchart of a method according to embodiments of the disclosure.

The operation of the base station is described in more detail with respect to FIG. 4 which shows a flowchart of a method 400 performed by the base station 300. The method is for transmitting synchronisation signals in a plurality of carriers according to embodiments of the disclosure.

The method may begin with the baseband unit 302 outputting first and second synchronisation signals to the first and second digital processors 304*a*, 304*b* respectively, in which the first synchronisation signal is to be transmitted by the base station 300 on a first carrier of the plurality of carriers. The second synchronisation signal is to be transmitted by the base station 300 on a second carrier of the plurality of carriers.

In step 402, the first digital processor 304*a* applies a first time shift T, (e.g. a time delay) to the first synchronisation signal, offsetting the first synchronisation signal from the second synchronisation signal in time. The skilled person will appreciate that there are various ways in which the first time shift may be applied to the first synchronisation signal. For example, the time shift may be applied in the time domain, and comprise a time delay (e.g., implemented by one or more delay blocks, delay lines or delay filters). Alternatively, the time shift may be applied in the frequency domain, and comprise a phase shift. Those skilled in the art will appreciate that, in either case, the first synchronisation signal is shifted in time when the signals are transmitted.

The second digital processor 304*b* may also apply a second time shift 12 to the second synchronisation signal, wherein the second time shift is different from the first time shift (i.e. $\tau_1 \neq \tau_1$). The second time shift may be applied using the same or similar techniques as described above in respect of the first time shift. Providing a second digital processor to apply the second time shift enables applying the respective time shifts in parallel, thereby reducing computing time. Alternatively, the first processor 304*a* may apply both the first and second time shifts to the first and second synchronisation signals respectively. In this case, the second digital processor 304*b* may be omitted. In a further alternative, no second time shift may be applied, in which case the second digital processor 304*b* may also be omitted.

The digital processors 304*a*, 304*b* output the first and second synchronisation signals to the multiplexer 306. In step 404, the multiplexer combines signals for the plurality of carriers supported by the base station, including the first and second synchronisation signals, to form a combined signal. The first time shift applied in step 402 means that at least part of the first synchronisation signal is offset from the second synchronisation signal when they are combined, reducing the PAPR and CM of the combined signal.

The combined signal may be output to a third digital processor 308 for further processing. For example, the third digital processor 308 may perform one or more of the following: filtering, digital predistortion and crest-factor reduction. Crest-factor reduction is a process that reduces the amplitude of signals that would otherwise be subject to hard clipping in the power amplifier 312 (e.g., because the amplitude exceeds an operational limit of the amplifier 312), and may be implemented in several ways, e.g., peak windowing (in which the signal is multiplied by a mitigating function in a window around peaks that exceed the operational limit), peak cancellation (in which one or more signal peaks exceeding the operational limit are low-pass filtered and then subtracted from the signal), low-pass filtering, etc.

The third digital processor 308 may output the combined signal to the DAC 310, which converts the combined signal to the analogue domain and outputs the combined signal to the power amplifier 312 for amplification. The power amplifier 312 amplifies the combined signal (e.g. applies a gain to the combined signal) and outputs an amplified combined signal for transmission, e.g., to one or more antennas.

The base station 300 transmits the amplified signal. For example, the base station 300 may broadcast the amplified signal to one or more wireless devices, such as the wireless devices 104 described above in respect of FIG. 4. By applying one or more time shifts at the first and second digital processors 304*a*, 304*b*, the base station 300 reduces the PAPR and CM of the combined signal input to the power amplifier 312, which reduces the risk of signal distortion occurring during amplification.

The first and second synchronisation signals and associated time shifts are now described in more detail.

The first and second synchronisation signals may comprise any suitable synchronisation signals such as, for example, a PSS (e.g. comprising an m-sequence) and/or an SSS. The part of the first synchronisation signals to which the time shift is applied comprises the same type of synchronisation signal as the second time shift such that, for example, a PSS in the first synchronisation signal is offset in time from a PSS in the second synchronisation signal as a result of the applied time shift.

In particular examples, the first synchronisation signal comprises an SSB, which comprises a PSS and an SSS. The first digital processor 304 may thus apply the first time shift to part or all of the SSB. The first digital processor 304 may apply the time shift to just the PSS, to the PSS and the SSS, or to just the SSS, for example.

In examples in which the first digital processor 304*a* applies the first time shift to the PSS and the SSS in an SSB, the processor 304*a* may apply the same time shift to a PBCH and associated DMRS in the SSB such that the entire SSB is offset in time from, for example, another SSB on the second carrier. Alternatively, the time shift may be applied to the PSS and SSS only, so that the PSS and SSS in the SSB on the first carrier are offset in time from the PBCH and DMRS in the same SSB.

In another example, the first digital processor 304*a* may apply the first time shift to only part of a PSS or an SSS, e.g., as part of a cyclical shift to the PSS or SSS. In this context, the first digital processor 304*a* may apply the first time shift to a first part of the PSS such that the first part of the PSS, which was originally scheduled to be transmitted before a second part of the PSS, is instead transmitted after the second part of the PSS. Alternatively or additionally, the time shift may be applied to the second part of the PSS such that it is transmitted before the first part of the PSS, e.g., as part of a cyclical shift of the parts of the PSS. Cyclically shifting individual PSS sequences in this manner may reduce the magnitude of amplitude fluctuations in signal power when signals containing the PSSs for different carriers are combined (and thus reduce the PAPR and CM of the combined signal). This approach may also be used for other types of synchronisation signals, such as SSS for example.

Thus the first digital processor 304*a* may apply the first time shift to only part of or the whole of the first synchronisation signal. In particular embodiments, the first digital processor 304*a* may apply different time shifts to different parts of the synchronisation signal. Alternatively, the first digital processor 304*a* may apply the first time shift to the whole first carrier (e.g. to all signals to be transmitted on the first carrier). All of the signals for the first carrier may thus be offset from the signals to be transmitted on the second carrier.

The first time shift may be based on, for example, a PCI associated with the first carrier (e.g. the PCI of the first carrier). The first time shift may be further determined based on the PCI associated with one or more other carriers in the plurality of carriers. The first time shift applied to the first synchronisation signal may thus be based on a determination that the first and second carriers have the same PCI value, indicating that the first synchronisation signal and the second synchronisation signal comprise a common sequence. For example, the base station 300 may apply a time shift to the first synchronisation signal and not to the second synchronisation to offset them in time. Alternatively, as noted above, the base station 102 may apply respective time shifts to the first and second synchronisation signals (using the first and second digital processors 304*a*, 304*b*), in which the respective time shifts have different values.

The applied time shift may be, additionally or alternatively, based on a repetition pattern indicating which sequences are used for synchronisation signals for different carriers. In some embodiments, the base station 102 may be configured to repeat the same synchronisation sequence every n carriers. Thus, in examples in which PCIs are assigned to carriers sequentially, the first time shift may be determined based on $N_{PCI}$ mod n, in which $N_{PCI}$ is the PCI value for the first carrier. For example, in an NR network in which the sequences used for PSSs are repeated every n=3 carriers, the time shift for the first carrier may be determined such that the first carrier is offset from any other carriers having the same value for $N_{PCI}$ mod 3.

The values of the time shifts applied herein may be substantially smaller than the values according to which time resources (e.g., symbols, time slots, sub-frames, etc) are allocated in the wireless networks described herein. For example, in wireless networks implementing NR and LTE standards, OFDM symbols have a duration on the order of multiple microseconds (e.g., from 4 to 71 microseconds, depending on the numerology employed). In this context, the time shifts discussed herein may have values on the order of multiple nanoseconds. In some embodiments, therefore, despite being shifted in time relative to each other, the synchronisation signals described herein may be considered to be transmitted using simultaneous time resources.

The values of the time shifts may be limited by network requirements. For example, the 3GPP Technical Specification (TS) 38.133 (v 16.5.0) specifies maximum receive timing difference (MRTD) requirements, which may be used to constrain the first time shift applied by the base station 300. Thus, the time shift applied by the base station 300 may be determined such that the relative timing difference between different carriers does not exceed MRTD requirements.

For example, NR networks may have two designated frequency ranges, FR1 and FR2. For FR2 intra-band non-contiguous NR carrier aggregation, wireless devices may be capable of handling a relative timing difference between slots of different carriers to be aggregated at the receiver if MRTD<260 ns. In some embodiments, therefore, the time shifts applied by the network may be determined such that the relative timing difference between different carriers does not exceed 260 ns. For FR2 intra-band contiguous NR carrier aggregation, wireless devices may be capable of handling a relative timing difference of <130 ns (e.g. as determined by timing alignment error requirements). In other embodiments therefore, the time shifts applied by the network may be determined such that the relative timing difference between different carriers does not exceed 130 ns. The same or similar limits may also be applied to FR1, for example.

The value of the first time shift may be predetermined. For example, each carrier may be assigned a respective time shift in a look-up table. To apply the first time shift to the first synchronisation signal, the base station 300 may, for example, consult the look-up table to determine the respective time shift for that carrier (e.g., based on the PCI or carrier index for that carrier and/or the PCI or carrier indices for other carriers supported by the base station 300). The look-up table may be stored at the base-station 300 (e.g. the base station 300 may be preconfigured with the look-up table). Alternatively, the look-up table may be stored on another node (e.g. a node in a core network such as the core network 108) and the base station 300 may query the other node to obtain the first time shift.

Alternatively, the first time shift may be calculated as needed. The first time shift may, for example, be calculated at the base station 300 or another node in the network. In the latter case, the base station 300 may query the other node for a time shift value for the first carrier, prompting the node to calculate and respond with the requested time shift.

The base station 300 thus applies a first time shift to at least part of a first synchronisation signal on a first carrier to offset the first synchronisation signal from a second synchronisation signal to be transmitted on a second (different) carrier. As noted above, the base station 300 may also apply a second time shift to the second synchronisation. The second time shift may be determined using the approaches described above in respect of the first time shift.

In general, the base station 300 may apply one or more respective time shifts for one or more carriers in the plurality of carriers. For example, the base station 300 may apply a respective time shift to synchronisation signals to be transmitted on each of the carriers in the plurality of carriers. The respective time shifts may be determined according to one or more of the approaches outlined above in respect of the first and second synchronisation signals.

Although the method 400 has been described as being implemented by the base station 300, the skilled person will appreciate that the method 400 may in general be performed by any suitable base station or network node. Similarly, it will be appreciated that various modifications may be made to the base station 300 whilst still allowing the method 400 to be performed. For example, rather than providing first and second digital processors 304*a*, 304*b* to apply the first and second time shifts, the second digital processor 304*b* may be omitted such that the time shifts are applied by a single processor. In another example, the third digital processor 308 may be omitted. In yet a further example, the digital processors 304*a*, 304*b*, 308 and the multiplexer 306 may be comprised in a single unit. Alternatively, the method 400 may be performed by a part of a base station, such as a baseband unit, digital unit, a remote radio unit, etc.

For the purpose of illustrating the operation and performance of embodiments of the present disclosure, the methods disclosed herein have been applied in simulations of base station.

Figure 5:
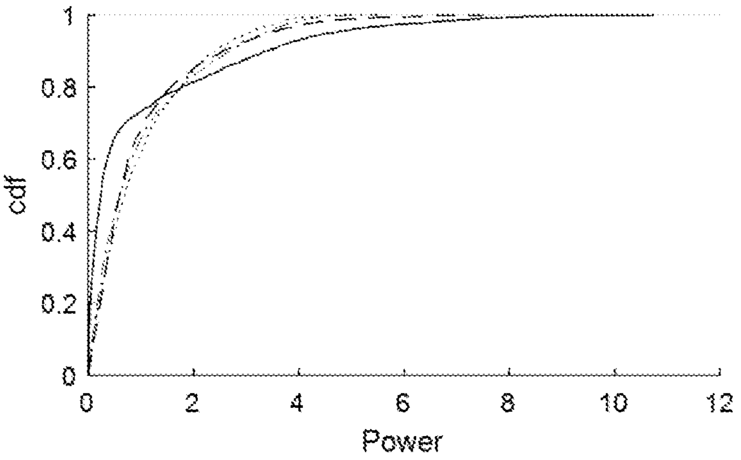
FIG. 5 shows signal power measurements for simulations of signals to be transmitted by a base station.

FIG. 5 shows signal power measurements for simulations of signals to be transmitted by a base station according to embodiments of the disclosure. The solid line shows the cumulative distribution function of signal power measurements from FIG. 2*b*, from a simulation in which the same PSS sequence is repeated in the first 127 carriers of four 100 MHz carriers without any time shifts applied. The dashed line, dot-dashed line and dotted line show the cumulative distribution function of signal power when different sets of time shifts (or delays) are applied to the four carriers. In particular, the time shifts are set to 0, 15, 30 and 45 ns (dashed line), 0, 30, 60 and 90 ns (dot-dashed line) and 0, 45, and 135 ns (purple line). As shown in FIG. 5, applying any of these sets of time shifts changes the signal power distribution and thus the PAPR of the combined signal. In addition, the PAPR and CM of the combined signal is further dependent on the particular time shifts used. The time shifts to be applied by the base station 300 may be optimised based on parameters such as the number of carriers, the sequences to be used for synchronisation signals (e.g. PSS and/or SSS sequences), numerology and/or bandwidth. For example, the parameters may be optimised based on simulations such as that shown in FIG. 5.

Figure 6:
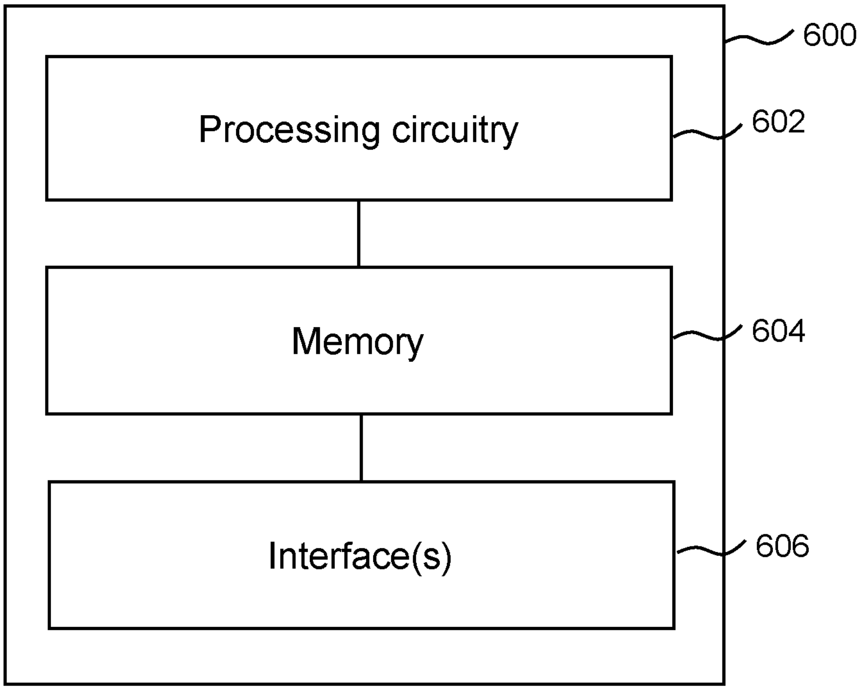
FIGS. 6 and 7 show examples of base stations according to embodiments of the disclosure.

FIG. 6 is a schematic diagram of a base station 600 for transmitting synchronisation signals on a plurality of carriers according to embodiments of the disclosure. The base station 600 may be, for example, the base station 102 described above in respect of FIG. 1 or the base station 300 described above in respect of FIG. 3. The base station 600 may be operable to carry out the example method 400 described with reference to FIG. 4 and possibly any other processes or methods disclosed herein. It is also to be understood that the method 400 of FIG. 4 may not necessarily be carried out solely by the base station 600. At least some operations of the method can be performed by one or more other entities.

The base station 600 comprises processing circuitry 602 (such as one or more processors, digital signal processors, general purpose processing units, etc), a machine-readable medium 604 (e.g., memory such as read-only memory (ROM), random-access memory, cache memory, flash memory devices, optical storage devices, etc) and one or more interfaces 606.

In one embodiment, the machine-readable medium 604 stores instructions which, when executed by the processing circuitry 602, cause the base station 600 to: apply a time shift to at least part of a first synchronisation signal to be sent by the base station on a first carrier of the plurality of carriers such that the at least part of the first synchronisation signal is offset in time from a second synchronisation signal to be sent on a second carrier of the plurality of carriers. The base station is further caused to combine signals for the plurality of carriers, including the first and second synchronisation signals, to form a combined signal, amplify the combined signal using a power amplifier; and transmit the amplified combined signal In other embodiments, the processing circuitry 602 may be configured to directly perform the method, or to cause the base station 600 to perform the method, without executing instructions stored in the non-transitory machine-readable medium 604, e.g., through suitably configured dedicated circuitry.

The one or more interfaces 606 may comprise hardware and/or software suitable for communicating with other nodes of the communication network using any suitable communication medium. For example, the interfaces 606 may comprise one or more wired interfaces, using optical or electrical transmission media. Such interfaces may therefore utilize optical or electrical transmitters and receivers, as well as the necessary software to encode and decode signals transmitted via the interface. In a further example, the interfaces 606 may comprise one or more wireless interfaces. Such interfaces may therefore utilize one or more antennas, baseband circuitry, etc. The components are illustrated coupled together in series; however, those skilled in the art will appreciate that the components may be coupled together in any suitable manner (e.g., via a system bus or suchlike).

In further embodiments of the disclosure, the base station 600 may comprise power circuitry (not illustrated). The power circuitry may comprise, or be coupled to, power management circuitry and is configured to supply the components of base station 600 with power for performing the functionality described herein. Power circuitry may receive power from a power source. The power source and/or power circuitry may be configured to provide power to the various components of base station 600 in a form suitable for the respective components (e.g., at a voltage and current level needed for each respective component). The power source may either be included in, or external to, the power circuitry and/or the base station 600. For example, the base station 600 may be connectable to an external power source (e.g., an electricity outlet) via an input circuitry or interface such as an electrical cable, whereby the external power source supplies power to the power circuitry. As a further example, the power source may comprise a source of power in the form of a battery or battery pack which is connected to, or integrated in, the power circuitry. The battery may provide backup power should the external power source fail. Other types of power sources, such as photovoltaic devices, may also be used.

In particular embodiments of the disclosure, the base station 600 may comprise a plurality of separate units over which the functionality of the base station 600 is distributed. The base station 600 may thus be a distributed (e.g. modular) base station such as, for example, an Open Radio Access Network (O-RAN) node.

In these embodiments, the base station 600 may comprise a radio equipment controller (e.g. a baseband processing unit) and one or more remote radio equipment nodes (e.g. radio frequency transceivers). The radio equipment nodes are not co-located with the radio equipment controller and, in particular, the radio equipment nodes may be positioned at a significant distance from the radio equipment controller such that the radio equipment controller can centrally serve a large number of remote radio equipment nodes.

The radio equipment controller may be directly or indirectly connected to the remote radio equipment nodes. The radio equipment nodes may be connected to the radio equipment controller via one or more fibre links (e.g. lossless fibre links). The interface between the units in a distributed base station be defined by the Common Public Radio Interface (CPRI), which standardizes the protocol interface between a radio equipment controller and radio equipment nodes in wireless distributed base stations to enable interoperability of equipment from different vendors. In order to reduce the number of connections (e.g. fibre links) needed, the radio equipment nodes may be connected to a common CPRI concentrator, for example.

Thus, in embodiments in which the base station 600 comprises a distributed base station, the processing circuitry 602 and the machine-readable medium 604 may be comprised in, for example, a radio equipment controller which is configured to control one or more radio equipment nodes forming part of the base station 600. Thus, the methods described herein (e.g. the method 400) may be performed by a radio equipment controller in the base station 600. Alternatively, the processing circuitry 602 and the machine-readable medium 604 may be comprised in one of the radio equipment nodes (e.g. at a transceiver).

Figure 7:
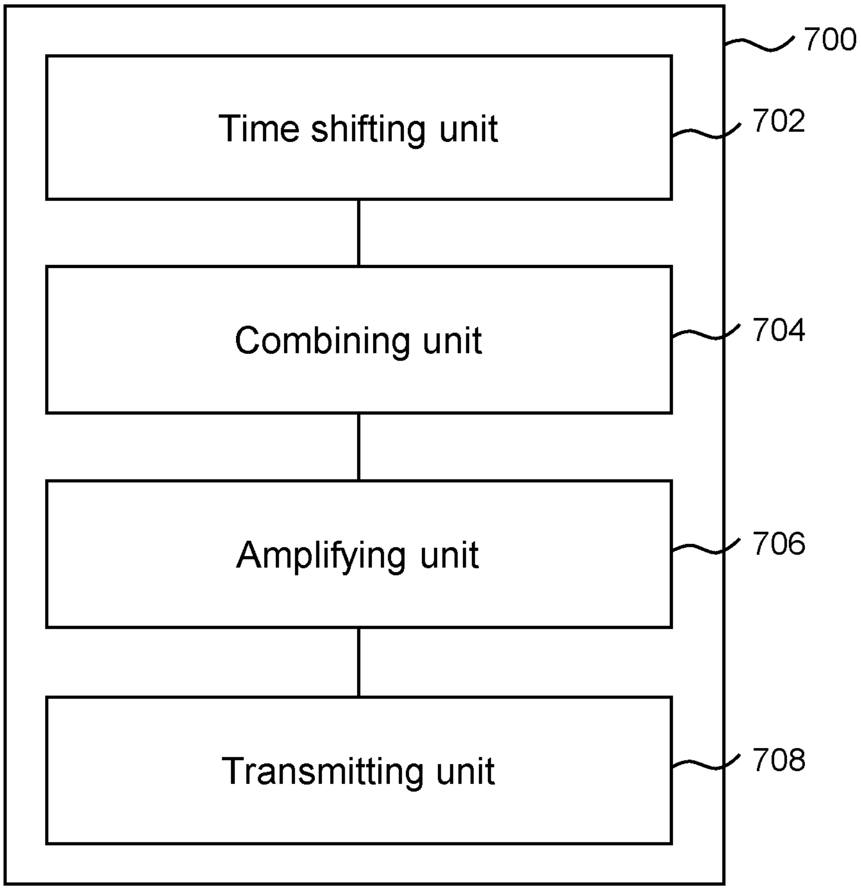

FIG. 7 is a schematic diagram of a base station 700 for transmitting synchronisation signals on a plurality of carriers according to embodiments of the disclosure. The base station 700 may be, for example, the base station 102 described above in respect of FIG. 1 or the base station 300 described above in respect of FIG. 3. The base station 700 may be operable to carry out the exemplary method 400 described with reference to FIG. 4 and possibly any other processes or methods disclosed herein. It is also to be understood that the method 400 of FIG. 4 may not necessarily be carried out solely by the base station 700. At least some operations of the method can be performed by one or more other entities.

The base station 700 comprises a time shifting unit 702, which is configured to apply a time shift to at least part of a first synchronisation signal to be sent by the base station on a first carrier of the plurality of carriers such that the at least part of the first synchronisation signal is offset in time from a second synchronisation signal to be sent on a second carrier of the plurality of carriers. The base station 700 further comprises a combining unit 704, which is configured to combine signals for the plurality of carriers, including the first and second synchronisation signals, to form a combined signal. The base station 700 further comprises an amplifying unit 706 configured to amplify the combined signal using a power amplifier and a transmitting unit 708 configured to transmit the amplified combined signal.

Thus, for example, the time shifting unit 702, combining unit 704, amplifying unit 706 and the transmitting unit 708 may be configured to perform steps 402-408 (described above in respect of FIG. 4) respectively.

The base station 700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause the time shifting unit 702, combining unit 704, amplifying unit 706 and the transmitting unit 708, and any other suitable units of base station 700 to perform corresponding functions according one or more embodiments of the present disclosure.

The base station 700 may additionally comprise power-supply circuitry (not illustrated) configured to supply the base station 700 with power.

The present disclosure thus provides apparatus (e.g. base stations) and methods for transmitting synchronisation signals on multiple carriers. By applying a time shift to at least part of a synchronisation signal on one carrier to offset it from a synchronisation signal on another carrier, aspects of the present disclosure reduce the PAPR and/or CM of signals input to a power amplifier, thereby reducing the risk of signal distortion and improving amplifier performance.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A base station for transmitting synchronisation signals on a plurality of carriers, wherein the base station comprises processing circuitry and a machine-readable medium storing instructions which, when executed by the processing circuitry, cause the base station to:

apply a time shift to at least part of a first synchronisation signal to be sent by the base station on a first carrier of the plurality of carriers such that the at least part of the first synchronisation signal is offset in time from a second synchronisation signal to be sent on a second carrier of the plurality of carriers;

combine signals for the plurality of carriers, including the first and second synchronisation signals, to form a combined signal;

amplify the combined signal using a power amplifier; and transmit the amplified combined signal, wherein the time shift applied to the at least part of the first synchronisation signal is determined based on a physical cell identifier NPCI associated with the first carrier, and wherein applying a time shift comprises applying respective time shifts to at least parts of the synchronisation signals for the plurality of carriers, such that the parts of any two synchronisation signals of the plurality of carriers comprising a same sequence are offset in time from each other, wherein the amount of time shift applied is smaller than the time values used to allocate time resources, wherein the base station is configured to repeat sequences used for synchronisation signals every n carriers and a time offset for the first carrier is determined based on n.

2. The base station of claim 1, wherein the time shift applied to at least part of the first synchronisation signal is further based on one or more physical cell identifiers associated with one or more other carriers in the plurality of carriers.

3. The base station of claim 1, wherein the time offset for the first carrier is determined based on a carrier index $N_{ind}=N_{PCI}$ mod n.

4. The base station of claim 3, wherein the first and second carriers are associated with a same carrier index.

5. The base station of claim 1, wherein the first and second carriers are associated with the same physical cell identifier.

6. The base station of claim 1, wherein the processing circuitry further causes the base station to:

apply the time shift to at least part of a third synchronisation signal to be sent by the base station on a third carrier of the plurality of carriers, wherein the first and third carriers are associated with different physical cell identifiers.

7. The base station of claim 1, wherein applying a time shift comprises applying respective time shifts to at least parts of the synchronisation signals for the plurality of carriers, such that the parts of any two synchronisation signals of the plurality of carriers comprising different sequences are not offset in time from each other.

8. The base station of claim 1, wherein applying the time shift to the at least part of the first synchronisation signal comprises applying the time shift to the whole first synchronisation signal.

9. The base station of claim 8, wherein applying the time shift to the at least part of the first synchronisation signal comprises applying the time shift to all signals for the first carrier.

10. The base station of claim 1, wherein applying the time shift to the at least part of the first synchronisation signal comprises applying the time shift to only the part of the first synchronisation signal.

11. The base station of claim 10, wherein the first synchronisation signal comprises a primary synchronisation signal and applying the time shift to only the part of the first synchronisation signal comprises applying the time shift to only part of the primary synchronisation signal.

12. The base station of claim 1, wherein the at least part of the first synchronisation signal comprises one or more of: a primary synchronisation signal and a secondary synchronisation signal.

13. The base station of claim 12, wherein the primary synchronisation signal comprises an m-sequence.

14. The base station of claim 12, wherein the first synchronisation signal comprises a synchronisation signal block.

15. A method performed by a base station for transmitting synchronisation signals on a plurality of carriers, the method comprising:

applying a time shift to at least part of a first synchronisation signal to be sent by the base station on a first carrier of the plurality of carriers such that the at least part of the first synchronisation signal is offset in time from a second synchronisation signal to be sent on a second carrier of the plurality of carriers;

combining signals for the plurality of carriers, including the first and second synchronisation signals, to form a combined signal;

amplifying the combined signal using a power amplifier; and transmitting the amplified combined signal, wherein the time shift applied to the at least part of the first synchronisation signal is determined based on a physical cell identifier NPCI associated with the first carrier, and wherein applying a time shift comprises applying respective time shifts to at least parts of the synchronisation signals for the plurality of carriers, such that the parts of any two synchronisation signals of the plurality of carriers comprising a same sequence are offset in time from each other, wherein the amount of time shift applied is smaller than the time values used to allocate time resources, wherein the base station is configured to repeat sequences used for synchronisation signals every n carriers and a time offset for the first carrier is determined based on n.

16. The method of claim 15, wherein the time shift applied to at least part of the first synchronisation signal is further based on one or more physical cell identifiers associated with one or more other carriers in the plurality of carriers.

17. The method of claim 15, wherein the time offset for the first carrier is determined based on a carrier index $N_{ind}=N_{PCI}$ mod n.

18. The method of claim 17, wherein the first and second carriers are associated with a same carrier index.

19. The method of claim 15, wherein the first and second carriers are associated with the same physical cell identifier.

* * * * *